W. F. MacGREGOR & A. C. FOSTER.
STRAW BRUISER.
APPLICATION FILED JUNE 24, 1911.
1,154,262.
Patented Sept. 21, 1915.
4 SHEETS—SHEET 1.
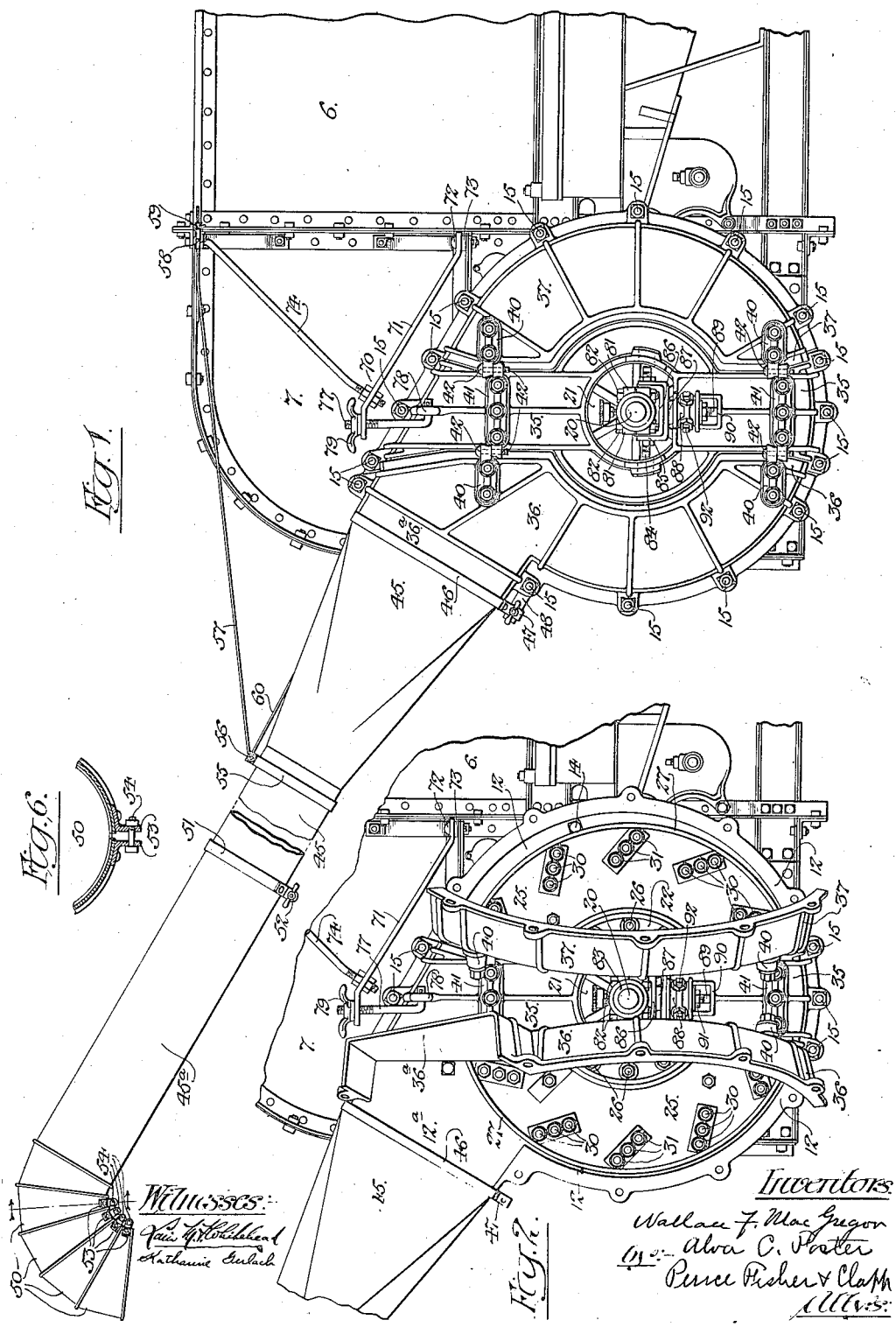

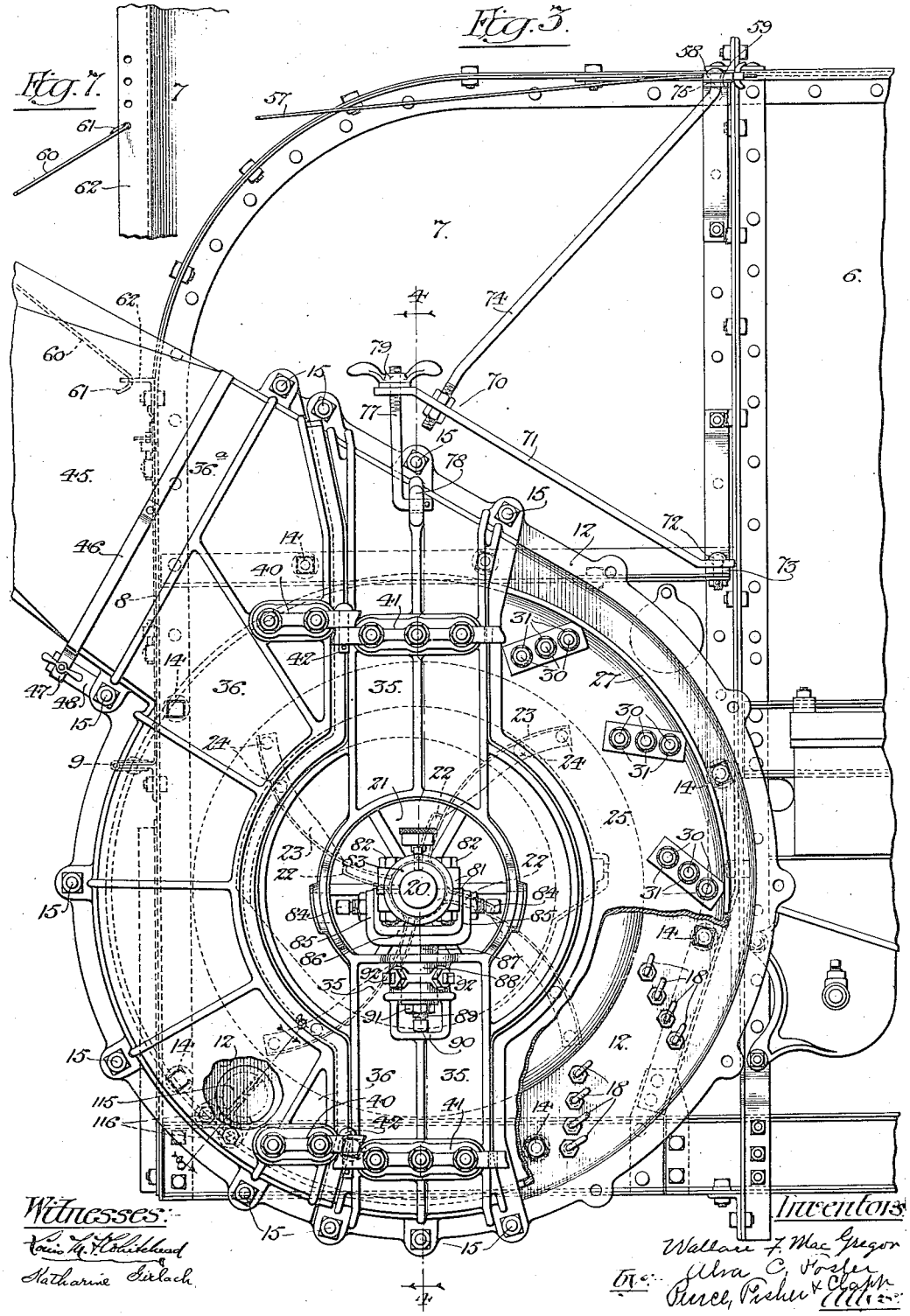

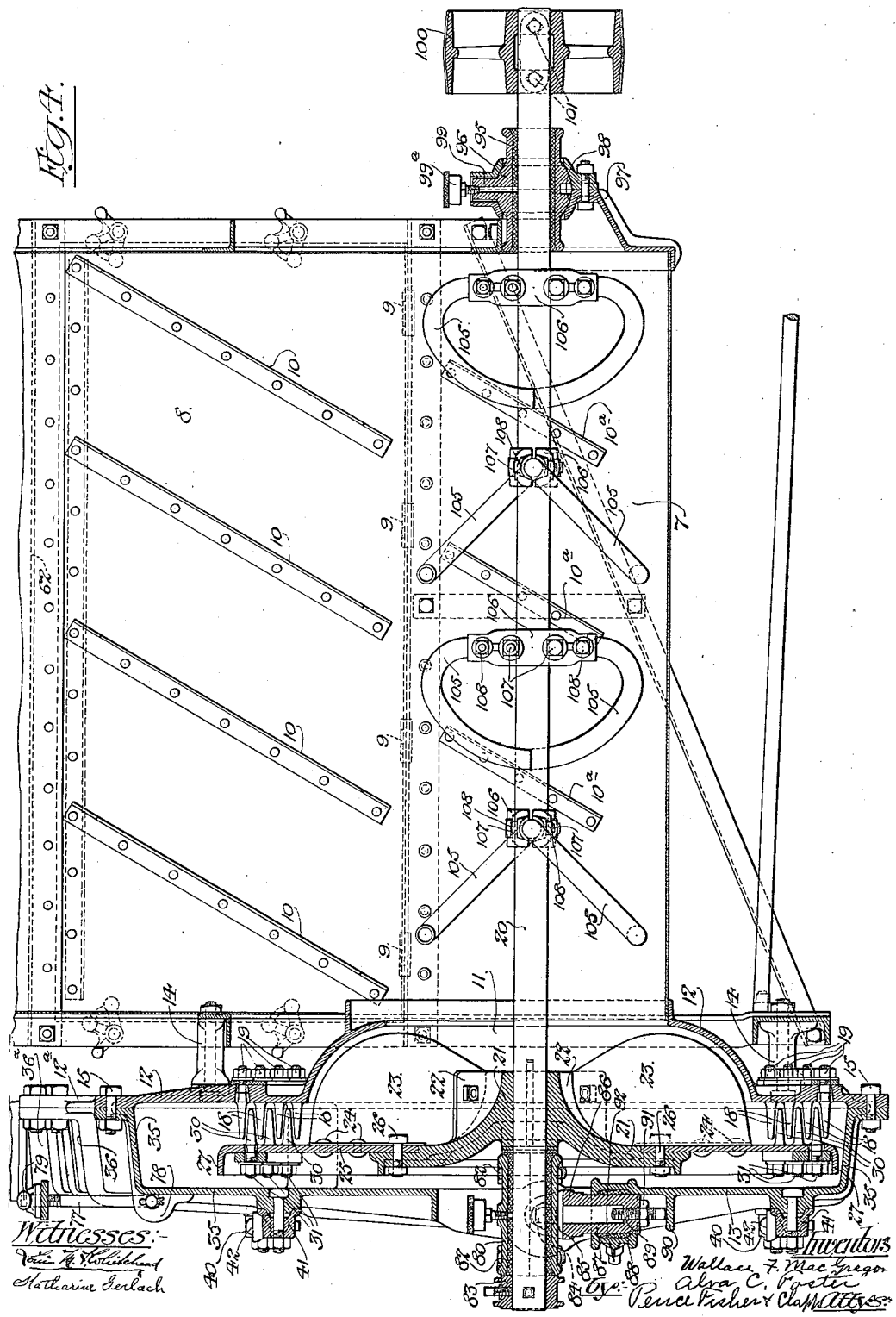

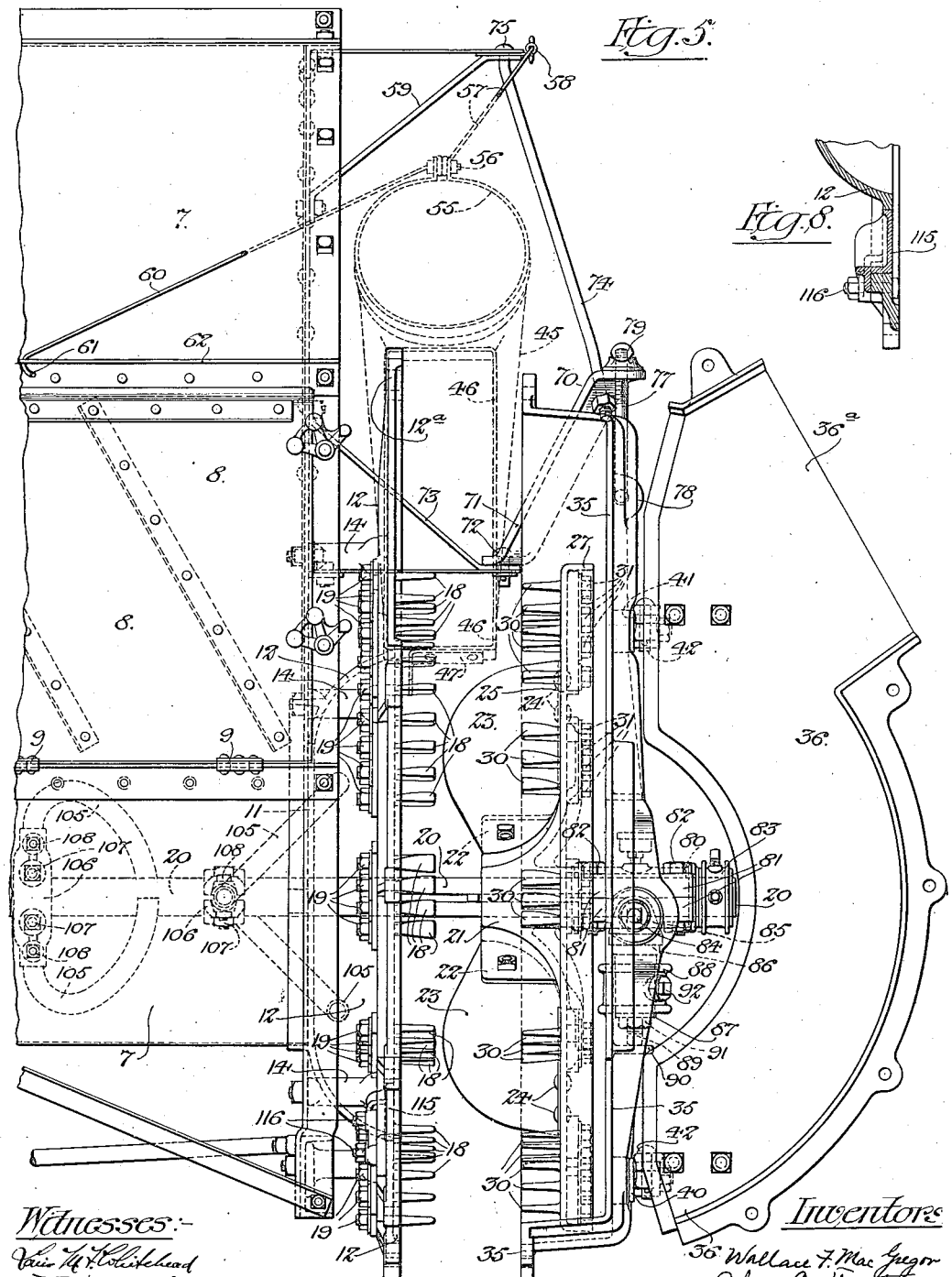

UNITED STATES PATENT OFFICE.

WALLACE F. MacGREGOR AND ALVA C. FOSTER, OF RACINE, WISCONSIN, ASSIGNORS TO J. I. CASE THRESHING MACHINE COMPANY, OF RACINE, WISCONSIN, A CORPORATION.

STRAW-BRUISER.

1,154,262.  Specification of Letters Patent.  Patented Sept. 21, 1915.

Application filed June 24, 1911.  Serial No. 635,224.

*To all whom it may concern:*

Be it known that we, WALLACE F. MAC-GREGOR and ALVA C. FOSTER, citizens of the United States, residing at Racine, in the county of Racine and State of Wisconsin, have invented certain new and useful Improvements in Straw-Bruisers, of which we do declare the following to be a full, clear, and exact description, reference being had to the accompanying drawing, forming part of this specification.

The present invention relates to that class of machines designed to receive the straw from a threshing machine and macerate, chop or tear the straw into small pieces and eject it from the machine. Straw thus treated is largely used for feeding stock in certain countries and the apparatus whereby the maceration of the straw is effected is commonly known in the trade as a straw bruiser, this apparatus being sometimes connected with and forming part of a separator and being sometimes used as a separate and distinct structure. In the accompanying drawings our improved apparatus is shown as located at the end of a separator of any suitable or familiar construction, although it will be understood that such apparatus may be embodied in a separate machine.

The invention consists in the features of construction hereinafter described, illustrated in the accompanying drawings and particularly pointed out in the claims at the end of this specification.

Figure 1 is a view in side elevation of the straw bruising or macerating mechanism embodying our invention, this mechanism being shown as at the end of a separator. Fig. 2 is a view in side elevation of parts of the apparatus shown in Fig. 1, the outer section being shown with its hinged sections opened to permit access to the interior of the housing. Fig. 3 is a view upon an enlarged scale of certain of the parts illustrated in Fig. 1, portions being removed for better illustration. Fig. 4 is a view in central vertical section on line 4—4 of Fig. 3 looking toward the rear of the machine, as indicated by the arrows. Fig. 5 is a rear end view of the apparatus at the right-hand side of the machine, the portions of the housing being removed outward to permit access to be had to the teeth upon the inner fixed section of the housing. Fig. 6 (Sheet 1) is an enlarged detail sectional view through a portion of the straw discharge pipe. Fig. 7 (Sheet 2) is a detail view showing the manner of adjustably holding the discharge pipe. Fig. 8 (Sheet 4) is a detail view in vertical section through the door or plug in the inner fixed section of the housing.

Our improved straw bruising mechanism is shown as attached to the rear portion 6 of a separator which may be of any suitable construction, the end chamber 7 of which receives the straw after the grain has been separated therefrom. The walls of the chamber 7 are preferably formed of sheet metal and in the back end of the chamber 7 is formed an opening that is closed by a sheet metal door 8 (see Fig. 4) that is hinged as at 9 to the back portion of the chamber 7. Upon the interior of the door 8, which constitutes a part of the back wall of the chamber 7, are arranged angular metal strips 10 that are riveted to the door, these angular strips being disposed diagonally so as to direct the straw toward the eye or opening 11 of the housing or casing in which the straw bruising and ejecting mechanism is contained.

The housing or casing comprises an inner fixed section 12 and an outer removable section 13, the inner fixed section being shown as attached to the body of the machine by suitable brackets 14. Adjacent its periphery, the inner fixed section of the housing 11 is provided with a series of holes adapted to receive the bolts 15 whereby the outer portions of the housing will be connected thereto, these outer portions of the housing being flanged and provided with holes to receive the bolts 15. Through the inner section 12 of the housing project the teeth 18 that are preferably arranged in groups, as shown, these teeth being similar to the teeth commonly employed in threshing machines and having shanks that project through holes formed in the inner section of the housing, the threaded ends of these teeth shanks being engaged by exterior nuts 19 that securely hold them in place.

Between the inner section 12 and the outer section 13 of the housing and mounted upon a drive shaft 20 is a disk 21 that is preferably formed of a central casting, the hub whereof is formed with offset ribs 22 to which are bolted the fan blades 23 formed of sheet metal. These fan blades 23 are flanged and riveted as at 24 to the annular outer portion 25 of the disk 21, this annular outer portion of the disk being bolted as at 26 to the central cast portion of the disk. The outer portion 25 of the disk is preferably formed of steel plate and its periphery is flanged outward, as at 27, whereby great strength is given to the disk, as well as a more even balance which insures its true line under high speed. Adjacent its periphery and outside the fan blades 23, the outer portion 25 of the disk is formed with holes through which project the teeth 30 that coöperate with the teeth 18 in bruising or macerating the straw. These teeth 30 are similar to the teeth 18 in shape and have threaded ends which are engaged by nuts 31 that serve to securely hold the teeth in position.

The outer portion of the housing, in the preferred embodiment of our invention, comprises a vertical casting 35 having a a central opening therein through which projects the outer end of the shaft 20 whereon the revoluble disk is mounted. To this central part 35 of the outer portion of the housing are connected the hinged sections 36 and 37 (preferably 2 in number) of the outer portion of the housing. These sections 36 and 37 (see Fig. 1) are preferably formed of cast metal with strengthening ribs upon their exterior surface and to them are bolted the castings 40 which coöperate with similar castings 41 attached to the section 35 of the housing in forming hinges, the castings 40 and 41 having holes therein to receive hinge pintles 42. The peripheral flanges of the hinge sections 36 and 37, when in closed position, (see Fig. 1) are united by the bolts 15 to the corresponding peripheral flanges of the inner section 12 of the housing.

The inner portion 12 of the housing is formed at its top with a section 12ª and the hinge section 36 is formed at its top with a section 36ª, and these sections 12ª and 36ª of the housing, when in closed position, constitute a discharge channel through which the bruised straw will be ejected into the inner end 45 of a discharge chute or pipe at the rear of the machine. The outer edges of the sections 12ª and 36ª set slightly within a band 46 that encircles the inner end of the discharge pipe section 45, this band 46 having at its lower side a perforated projection 47 whereby the band may be connected, as by a cotter pin, to a clip 48 projecting from the adjacent bolt 15 of the housing.

The discharge pipe, in addition to the inner section 45, comprises one or more outer sections 45ª telescopically mounted on the inner section 45 and a plurality of hood sections 50, four of these hood sections being shown in the drawings. The inner end of the section 45ª has fastened thereto a clamping ring 51 through the offset ends of which passes an adjusting screw 52, this clamping ring serving, when the section 45ª is turned to any desired extent or moved to any position upon the section 45, to be clamped and securely held in such position by tightening the adjusting bolt 52. The hood sections 50 fit over each other and, being independently revoluble with respect to each other, may be swiveled in any direction and any or all of the sections may be removed, if desired. Each hood section is shown as provided with sectional clamping brackets 53 through which pass bolts 54 that enable the hood sections to be held in any desired position with respect to each other and with respect to the outer end of the pipe section 45ª.

Around the discharge pipe section 45 passes a band 55 to the offset ends of which are connected by a bolt 56 the stay rod 57, the inner threaded end of which rod passes through the eye of a strap 58 (see Fig. 5) that is secured to a bracket 59 at the rear end of the upper part of the machine. A threaded wing nut on the threaded end of the stay rod 57 enables this rod to be adjusted in order to vary slightly the elevation of the discharge pipe. From the band 55 on the discharge pipe also extends an adjusting rod 60 (see Fig. 5) the lower end of which has a hooked end 61 adapted to enter any one of a number of holes formed in an angle iron 62 above the door opening at the rear end of the machine, so that when the discharge pipe is swung toward the center of the rear end of the machine, it may be held in such position by moving the hooked end 61 of the rod 60 to a hole nearer the center of the machine. The discharge pipe is held at an angle of about 30 degrees elevation, so that a team may readily pass beneath the discharge pipe and between the body of the machine and the stack of straw being formed.

To one side of the body of the machine is attached a suitable support or derrick 70, the main function of which is to sustain the outer section of the housing when the sections of the housing have been separated to permit access to its interior, as illustrated in Fig. 5 of the drawings. Preferably, the derrick 70 consists of an arm 71 pivotally mounted, as at 72, at its lower end to a bracket 73 that projects outwardly from the side of the machine, and the upper end of this arm 71 is connected to a rod 74, the upper end of which is pivoted, as at 75, to the bracket 59. The outer end of the rod or bar 71 is shown as provided with an opening through which passes a threaded rod 77, the lower bent end of which is adapted to enter a hole formed in an offset flange 78 at the top of the central portion of the outer section of the housing, (see Fig. 3) and a wing nut 79 engaging the threaded upper end of the rod 77 enables this rod to be adjusted as may be desired. The purpose of the derrick 70 is to sustain the weight of the outer section of the housing, when this outer section of the housing has been disconnected from the inner section of the housing to permit access to the interior, as illustrated in Fig. 5 of the drawings.

Upon the outer end of the shaft 20, to which is keyed the revoluble fan disk 21 (see Fig. 4), is placed a bearing-sleeve 80 that sets within a bearing formed of longitudinal sections 81 that are united together by bolts 82. A collar 83 secured to the outer end of the shaft 20 holds the shaft in proper relation to its bearing. The lowest sectional bearing sleeve 81 is held in position by adjusting bolts 84 that pass through the upwardly extending arms 85 of a bearing bracket 86. The lower stem 87 of this bearing bracket 86 is revolubly mounted in a bushing or annular seat 88 that is preferably formed integral with the central portion 35 of the outer section of the housing. The lower end of the stem 87 of the bearing bracket is formed with a threaded opening in which enters a threaded bolt 89, the lower end of which bolt bears against an offset flange 90 that projects outwardly from the face of the central section 35 of the outer portion of the housing. By means of this bolt 89 the bearing bracket can be raised or lowered, and a set nut 91 holds the bracket in any vertical position to which it may be adjusted. Bolts 92 that pass through threaded holes in the annular bearing sleeve 88 serve to hold the bearing bracket when it has been turned to desired position within the sleeve-bearing 88 and jam nuts upon these bolts 92 guard against accidental loosening of the bolts. The bolts 84 enable the outer bearing of the shaft 20 to be adjusted slightly in lateral direction and these bolts 84 are also furnished with jam nuts to securely retain them in desired position. On the opposite end of the shaft 20 is a bearing-sleeve 95 that is formed with a spherical or ball-shaped portion 96 that is mounted in a bearing bracket 97 having a correspondingly shaped socket 98 to receive the part 96. The part 96 of the bearing-sleeve has an upward extension 99 that passes through a tubular part of the socket 98 and to this upward extension is fitted a grease cup 99ª whereby the bearing-sleeve may be lubricated. It will thus be seen that the adjusting bolts which control the end of the shaft 20 adjacent the fan disk enable this shaft to be adjusted either vertically or horizontally, while the bearing at the opposite end of the shaft has sufficient freedom of movement to permit the desired adjustments.

Upon the end of the shaft 20 (see Fig. 4) a drive pulley 100 is fixed by means of set screws 101 and by loosening these set screws and removing the pulley from the shaft, the shaft, the outer section of the housing and the fan disk can be moved to the position shown in Fig. 5, for the purposes to be presently stated.

Upon the shaft 20 are mounted a series of arms 105 formed preferably of short lengths of bent gas-pipe set at an angle of about 45 degrees to the center line of the shaft, these arms constituting a straw auger for conveying the straw into the eye or opening 11 of the housing. As shown, the arms 105 are attached to the shaft by means of clamp hubs formed of malleable iron sections 106 that are clamped onto the shaft by suitable bolts 107, and bolts 108 passing through the arms 105 securely unite them to the sections 106. These arms 105, arranged as shown, serve to irresistibly advance the straw toward the eye or opening of the housing and may be run at very high speed without danger of creating any such wind draft as to disturb the straw, and without danger of "winding" the straw about the shaft.

By reference to Fig. 3 of the drawings, it will be seen that the inner section 12 of the housing or casing that incloses the fan disk is provided in its lower portion with a hole that is normally closed by a small door or plug 115, this door or plug 115 being preferably formed as a casting adapted to set within the hole and having offset arms that overlap the housing section 12 and are provided with holes through which pass the bolts 116 whereby the door or plug is held in normally closed position.

When the parts are in position for use, as illustrated in Figs. 1, 3 and 4 of the drawings, the threshed straw passing from the separator into the chamber 7 will be advanced by the arms 105, constituting (within the shaft 20) the fan auger, toward and into the opening 11 of the fan disk housing or casing, and the diagonally disposed bars 10 upon the door 8, and as well also the diagonally disposed bars 10ª·in the lower part of the chamber 7, aid in directing the straw toward the housing. In order to insure the true running of the shaft 20 and of the fan disk, and to insure the proper meshing of the teeth within the housing, the adjustment of the shaft bearing adjacent the housing can be effected as hereinafter described. The blades 23 of the fan serve to feed the straw between the bruiser teeth arranged outside the blades and to create a blast for ejecting the chopped straw from the machine.

By swinging open the door or doors 36 and 37 of the outer section of the housing, access can be had to the teeth 18 and 30 within the housing. If any tooth is found to be bent, it can be readily straightened by prying it with a small, thin crowbar, or by driving a cold chisel between the teeth, or in any similar manner; or, if any one of the teeth of the fan disk needs to be replaced, this can be readily accomplished by first removing the small door or plug 115 (see Fig. 3) in the fixed section of the housing and then bringing such tooth opposite the small door or plug opening and removing the defective tooth through such opening and substituting a new tooth in its place. In case one of the teeth in the inner section 12 of the housing becomes injured, so that it must be removed and replaced, this can be accomplished by first loosening all the bolts 15 that unite the separable part of the housing to the inner fixed section of the housing, then removing the pulley 100 from the shaft 20 and moving the shaft, the fan disk and the outer section of the housing to the position shown in Fig. 5 of the drawings. When the outer section of the housing is to be thus moved, it will be supported from the derrick 70 (see Fig. 3) by the suspension rod 77 which extends downward from the derrick and engages the lug 78 at the top of the central portion 35 of the outer section of the housing. It will thus be seen that, without disturbing the adjustment of the bearings or the interior mechanism, the parts within the housing can be quickly and readily reached for inspection or repairs.

The straw discharge pipe need not be removed when the housing is to be opened, as this pipe will simply be swung to one side and, by means of the rod 60, will be held in position. The discharge pipe can be lengthened or shortened by manipulating its telescopic sections, and these sections may be turned, one with respect to the other, so as to adjust the discharge mouth of the hood at the end of the outer section, and when the parts of the pipe section are brought to the desired position, they can be there held by means of a clamping band. So, also, the sections of the hood can be swiveled in any direction and fixed in any relative position by means of the sectional clamps with which the individual hood sections are provided.

Manifestly, the details of construction above set out may be varied without departing from the spirit of the invention, and features of the invention may be employed without its adoption as an entirety.

Having thus described our invention, what we claim as new, and desire to secure by Letters Patent, is:—

1. The combination with the machine frame, of a rotary, straw-bruising disk having teeth on its face, and an inclosing casing therefor comprising an inner section fixed to said frame and having teeth coöperating with the teeth of said disk, an outer casing section movable axially to and from said inner section, and a swinging support mounted on the frame for carrying said outer section when the latter is shifted from said inner section.

2. The combination with a machine frame, of a rotary, straw-bruising disk having teeth on its face, and an inclosing casing therefor comprising an inner section fixed to said frame and having teeth coöperating with the teeth of said disk, an outer casing section movable axially to and from said inner section, and a shaft whereon said disk is mounted, journaled in said outer section and movable axially therewith.

3. In an apparatus of the character described, the combination with the machine frame, of a rotary straw bruising disk having teeth on its face and an inclosing casing for said disk comprising circular inner and outer sections detachably secured together at the periphery of said casing, said inner section being fixed to said frame and having teeth coöperating with the teeth of said disk, a shaft whereon said disk is mounted journaled in said outer section, said outer section, said disk and said shaft being movable in axial direction to afford access to said teeth, and a shiftable support mounted on the frame for carrying said movable parts when the latter are shifted.

4. The combination with the machine frame, of a rotary straw-bruising disk, a housing for said disk comprising a fixed section on one side of the disk, a section on the opposite side of the disk movable axially to and from said first-mentioned section, means for detachably connecting said sections, and a swinging support for carrying said movable section when the latter is disconnected from said fixed section.

5. In an apparatus of the character described, a housing comprising an inner fixed section having projecting teeth, an outer section removably secured to said inner section, an intermediate revoluble disk provided with teeth coöperating with the teeth of the fixed section of the housing and a support projecting from the body of the machine for sustaining said outer section of the housing when moved away from said inner section.

6. The combination with the machine frame, of a rotary straw-bruising disk, a housing therefor comprising an inner section fixed to the frame, an outer section comprising two hinged parts, and means for detachably connecting both parts of said outer section to said inner section.

7. In an apparatus of the character described, the combination with the body of the machine, of mechanism for bruising the straw, a housing for inclosing said mechanism, the outer portion of said housing comprising a central part and sections hinged thereto and adapted to be swung open to permit access to the interior of the housing.

8. An apparatus of the character described, comprising a housing having a fixed inner section and a movable outer section, and a revoluble disk carrying teeth mounted between said sections, said inner section of the housing being formed with an opening opposite the path of travel of said teeth and a door or plug for closing said opening.

9. In an apparatus of the character described, the combination with the machine frame, of a rotary straw bruising disk, a housing for inclosing the same, the outer portion of said housing comprising a central part and opposite sections hinged thereto and adapted to be swung open to permit access to the interior of the housing, and a shaft whereon said disk is mounted journaled in said central part.

10. In a combined straw-bruising and stacking attachment for threshing machines, the combination with a housing having a delivery chute, of a rotating disk mounted within said housing and having rows of laterally projecting teeth on its face near its periphery, one wall of said housing having coöperating rows of teeth and a set of main fan blades fixed to the face of said disk within said rows of teeth and projecting laterally therefrom, said blades being arranged to force the straw past said teeth and through said delivery chute.

11. In a combined straw-bruising and stacking attachment for threshing machines, the combination with a housing having a delivery chute, of a shaft in said housing, a hub on said shaft, an annular sheet metal disk fixed to said hub and having a flanged edge, rows of teeth fixed to said disk, coöperating rows of teeth fixed to one wall of said housing, and a series of main fan blades secured to said hub within said rows of teeth and arranged to force the straw past the same and through said delivery chute.

12. In an apparatus of the character described, the combination with the machine frame, a vertically disposed rotary straw bruising disk, of a housing for said disk having a delivery chute and an axial opening for admitting straw thereto, and a feed chamber communicating with said opening, said chamber having a stationary end wall provided with diagonally disposed ribs for guiding the straw into said opening.

13. In an apparatus of the character described, the combination of a rotary straw bruising disk having laterally projecting teeth on its face, a housing therefor, laterally projecting teeth on the side wall of said housing coöperating with the teeth of said disk, a shaft whereon said disk is mounted, a bearing for said shaft and means for horizontally and vertically adjusting said bearing to thereby adjust the relative position of the coöperating teeth on said disk and said housing.

14. In an apparatus of the character described, the combination of a housing having an opening at its inner side wall for the admission of straw thereto, a revoluble straw bruising disk arranged in said casing and having laterally projecting teeth thereon, one wall of said housing having laterally projecting teeth coöperating with the teeth of said disk, a shaft whereon said disk is mounted extending through said housing, universally shiftable bearings for the ends of said shaft, and means for vertically and horizontally adjusting one of said bearings to thereby adjust the relative position of the coöperating teeth on said disk and said housing.

15. An apparatus of the character described, comprising a chamber to receive the straw, a housing having an opening communicating with said straw receiving chamber, means within said housing for bruising the straw and a rotary shaft extending through said straw receiving chamber provided with bent arms set at an angle to said shaft and serving to advance the straw from the chamber to the housing.

16. In an apparatus of the character described, the combination of a vertically disposed, rotary straw bruiser, a housing therefor having an opening in its side wall for admitting straw thereto, a feed chamber communicating with said opening, a rotary shaft whereon said disk is mounted extending through said housing and said feed chamber, and a series of bent arms mounted on said shaft at an angle thereto and serving to advance straw from said chamber and into said housing.

17. An apparatus of the character described, comprising straw bruising mechanism, a housing for inclosing said mechanism formed of an inner fixed section and an outer movable section, said sections having extensions near their top to form a discharge channel, and a discharge pipe the inner end whereof is arranged to coincide with said extensions of the housing, said pipe being movable laterally to permit the sections of the housing to be opened.

WALLACE F. MacGREGOR.
ALVA C. FOSTER.

Witnesses:
ALBERT B. WELTY,
THOMAS R. HOUGH.